Feb. 4, 1969
M. BREDVIK
3,425,098
ADJUSTABLE TOGGLE CLAMP
Filed Oct. 25, 1967
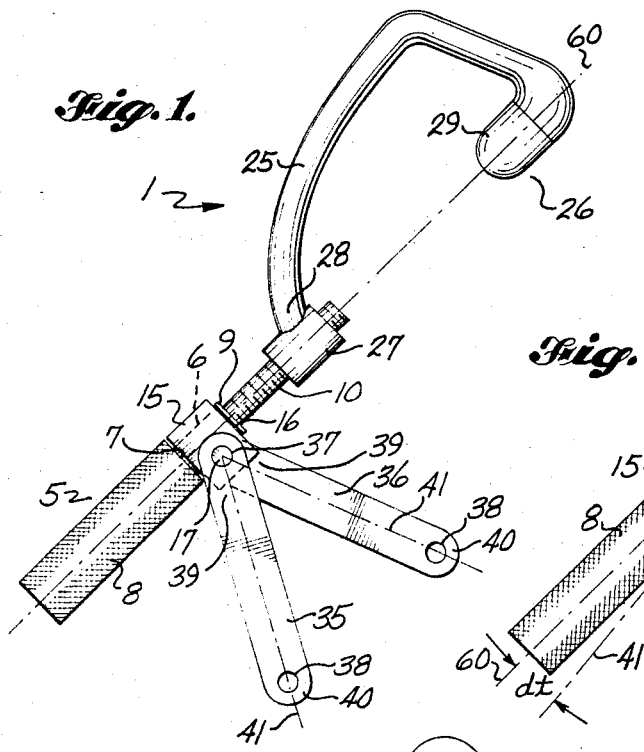
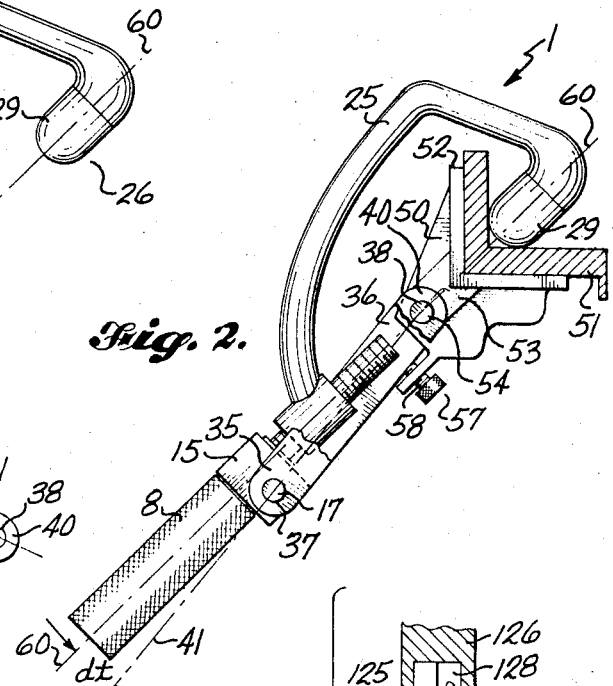
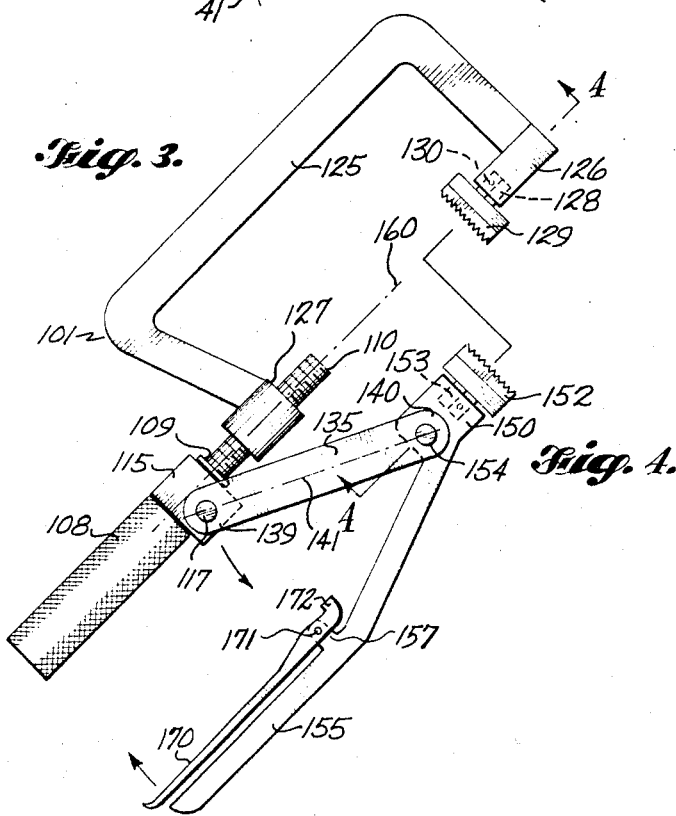
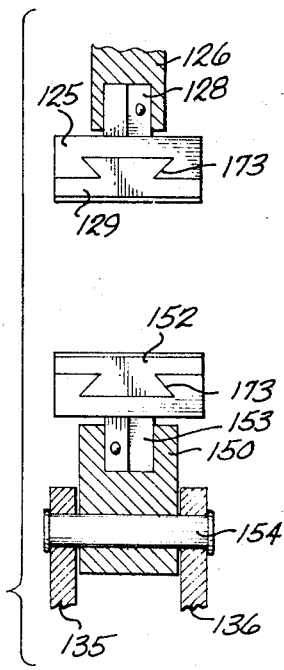
INVENTOR
MARTIN BREDVIK
BY Christensen, Sanborn
& Matthews
ATTORNEYS

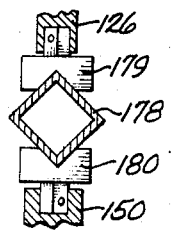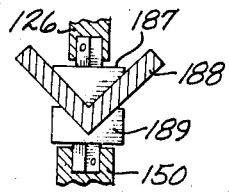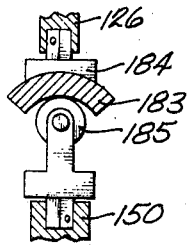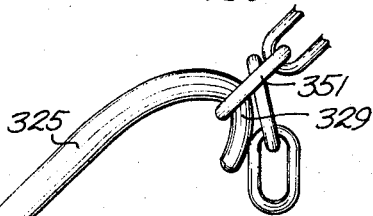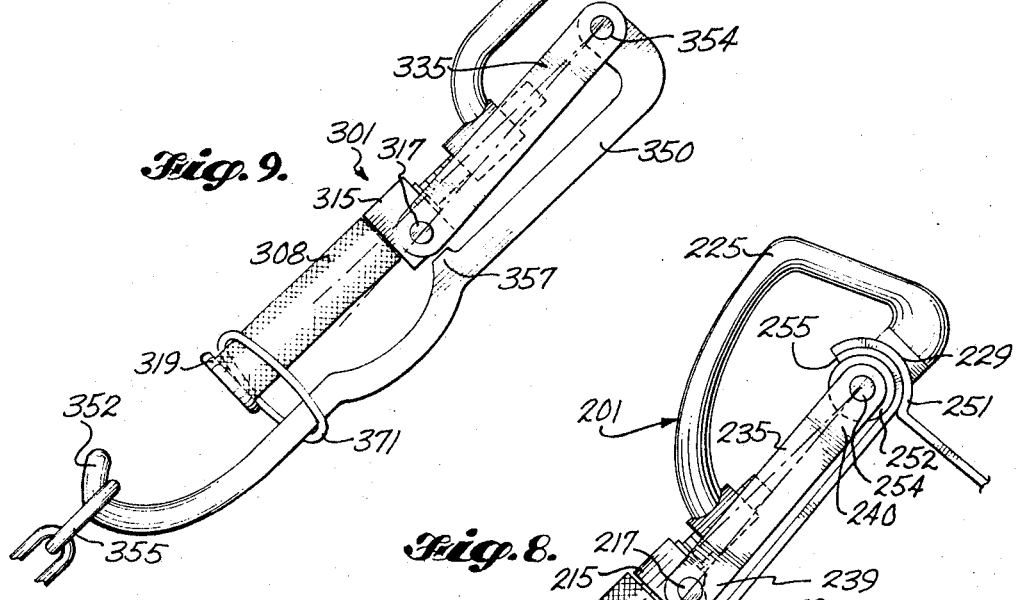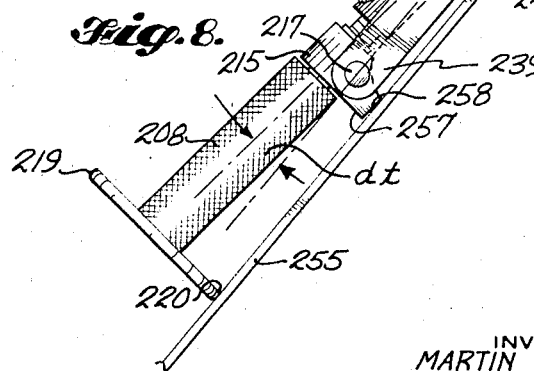

United States Patent Office 3,425,098
Patented Feb. 4, 1969

3,425,098
ADJUSTABLE TOGGLE CLAMP
Martin Bredvik, Mercer Island, Wash., assignor to The Boeing Company, Seattle, Wash., a corporation of Delaware
Filed Oct. 25, 1967, Ser. No. 677,996
U.S. Cl. 24—68      13 Claims
Int. Cl. A44b 21/00; B25f 5/12; B25h 1/10

ABSTRACT OF THE DISCLOSURE

An easily adjusted clamp assembly for use in a toggle action clamp or cable take-up tool. In one form the assembly includes a hook-shaped force application member which is attached through a threaded sleeve at its shank end to a threaded rod. The rod is held in a swivel block which is connected to one end of the toggle bars, and the other end of the rod forms a knurled handle which permits the rod to be threaded into or out of the hook sleeve to change the distance between the swivel block and the work-contacting portion of the hook. The workpiece is normally held in a support member which includes a pivot for pivotally holding the other end of the toggle arms. As the size of the workpiece changes, the clamp can be simply adjusted by turning the knurled handle portion. No adjusting tools are required. In the preferred form the hook is shaped so that the force application point is axially aligned with the axis of the threaded sleeve.

Background of the invention

*Field of the invention.*—This invention relates to improved clamping and chain or cable take-up tools and it relates more particularly to an improved, easily adjusted toggle action clamping assembly which can effectively clamp workpieces having a broad range of sizes.

*Description of the prior art*

While toggle action adjustable clamp tools are presently available, they are generally not of a design which permits easy adjustment since they require wrenches or other types of adjuting tools. It is therefore a cumbersome and time consuming operation which is required to make the individual adjustments to accommodate various sizes of workpieces to be clamped. Further, the geometry of the clamp members is such that as they are adjusted there is a tendency for the workpiece to be squeezed out of the grip of the clamping members because the force as applied to the workpiece by one clamping member is not coincident with the forces applied by the supporting member for certain sizes of workpieces. This prior art clamp configuration has a limited useful life in that distorting forces eventually bend the clamping portions out of shape. In addition to these limitations of usefulness of the currently used adjustable clamp tools, it has been found that there is a need for a simpler designed clamp assembly which can be fabricated using standard shaped stock items, resulting in a lower cost tool. It is therefore the principal object of the instant invention to provide a clamping assembly which is a simple design and yet permits easy adjustment without requiring adjusting tools.

It is another object of the instant invention to provide an improved toggle action clamping tool which throughout its range of adjustment is positioned relative to the workpiece and workpiece support member in such a way that the forces applied by the clamp assembly are coincident with the forces applied by the support member.

A still further object of the instant invention is to provide an improved clamp assembly which includes a clamping hook of a configuration which results in the axis of the forces applied by the portion of the hook contacting the workpiece being coincident with the axis of the sleeve portion at the shank end of the clamping hook to prevent distortion and to provide long life of the clamping hook.

It is yet another object of the instant invention to provide a toggle action adjustable clamp assembly which is suitable for use as a cable or chain take-up tool providing a broad range of adjustment while not requiring the use of adjusting tools.

It is a still further object of the instant invention to provide a clamping tool which through the pivoting action of its toggle and clamping members, can be completely removable from the clamping area of a workpiece support frame in a simple pivoting motion.

It is a related object of the instant invention to provide improved workpiece support members which, in combination with the improved clamp assembly, are useful as a tool for clamping a cover member to a side wall member of a container during its sealing operation.

Another related object of the instant invention is the provision of an improved adjusting handle for a toggle action tool which includes a finger guard for preventing injuries to the operator's hand during the use of the tool.

Yet another related object of the instant invention is to provide improved jaw pieces for toggle action clamping tools which can be quickly changed to accommodate different shapes of workpieces and to replace them when they are worn.

It is still a further related object of the instant invention to provide a nonmarring workpiece contact member at the end of the clamping member to prevent degradation of the workpiece.

Summary of the invention

The instant invention relates to an improved adjustable toggle action clamping tool which is easily adjusted without requiring the use of wrenches or other types of adjusting tools.

According to the invention, the tool includes an adjustable clamp assembly having a first force application means pivotally connected through toggle bars to a second force application means. The workpiece is clamped or otherwise held by said first and second force application means. The clamp assembly also includes an adjusting rod means which is supported within a rod aperture formed in a swivel block. One end of the rod extends outwardly from the rod aperture and includes a knurled portion for easy hand rotation of the rod. The other end of the rod extends outwardly from the other end of the rod aperture and includes a threaded shaft portion for adjustably supporting an internally threaded sleeve portion of the first force application means. The swivel block also includes first pivot means for pivotally holding one end of the toggle arms.

To adjust the position of the first force application means relative to the second force application means, it is merely required that the adjusting rod be rotated to move the sleeve relative to the swivel block.

These and other features and advantages of the invention will become more clearly apparent from the following detailed description thereof, which is to be read with reference to the accompanying drawings.

Brief description of the drawings

In the drawings:

FIGURE 1 is a side elevation view of a preferred embodiment of the clamp assembly of the instant invention;

FIGURE 2 is a side elevation view of one form of a workpiece support showing parts of the clamp assembly in the clamping position;

FIGURE 3 is a side elevation view of a hand tool embodiment utilizing a clamp assembly of the instant invention;

FIGURE 4 is a partial section view as seen through lines 4—4 of FIGURE 3 illustrating the removable jaw piece feature of the instant invention;

FIGURES 5 to 7 show other configurations of removable jaw pieces for use in the hand tool embodiment shown in FIGURE 3;

FIGURE 8 is a side elevation view of a third embodiment of the clamp assembly of the instant invention in a cover clamping position; and FIGURE 9 is a side elevation view of a fourth embodiment of the clamp assembly illustrating its utilization as a chain takeup tool.

*Description of the preferred embodiments*

To relate the significant features of the first embodiment of the instant invention, reference is had to FIGURES 1 and 2 wherein the clamp assembly 1 is illustrated. The basic components of clamp assembly 1 include adjusting rod 5, swivel block 15, first force application member 25 and toggle arms 35 and 36. The adjusting rod 5 includes a bearing shaft portion 6 shown in dotted lines within the rod aperture 16 of swivel block 15. The bearing shaft 6 is held within the rod aperture 16 through the action of the front surface 7 of the knurled member 8 at one end of the adjusting rod 5, and a retainer ring 9 which is placed at the other end of the rod aperture 16 around adjusting rod 5 just before the beginning of the threaded shaft portion 10. Thus positioned, the adjusting rod 5 is freely rotatable axially within the swivel block 15 so that as the knurled member 8 rotates, so also does the threaded shaft 10 rotate. While member 8 is stated as being knurled, it may have some other type of surface shape or treatment making it easy to grip and rotate.

The first force application member 25, shown in hook form in FIGURE 1, includes a first force application surface 26 positioned at its terminal end and an internally threaded sleeve 27 positioned at its shank end 28. As shown, the first force application surface is covered by a nonmarring cap 29, such as nylon. To adjust the distance between the terminal end cap 29 of the clamp hook 25 from the swivel block 15, all that is required is that the threaded shaft 10 be inserted into the interiorly threaded sleeve 27 and turned so that the sleeve 27 is moved toward or away from the swivel block 15, as desired.

The swivel block 15 also includes first pivot pins 17 which are positioned at right angles to the axis of the rod aperture 16 to establish a first pivot axis. Toggle arms 35 and 36 may be made from flat bar stock with first and second pivot apertures 37 and 38 being defined in the first and second ends 39 and 40 thereof. In this manner the toggle arms 35 and 36 are pivotally connected to swivel block 15 by means of first pivot pin 17 which is inserted through first apertures 37 at the first end 39 of the toggle arms 35 and 36.

With more specific reference to FIGURE 2 there is shown a first embodiment form of the second force application means in the form of workpiece support 50. The workpiece 51 is forced by the clamping action of the nonmarring cap 29 of the clamp hook 25 against a second force application surface 52 which is part of the workpiece support 50. Extending from and forming part of the workpiece support 50 is the second pivot support member 53, which includes second pivot pin 54 for pivotally supporting the second end 40 of the toggle arms 35 and 36 behind it. As the pivot pin 54 passes through the second pivot apertures 38, it establishes a second pivot axis. To limit the downward pivoting motion of the clamp assembly 1, workpiece support 50 includes stop means 57 mounted in the path of either one or both of the pivoting toggle arms 35 and 36 so that the adjustable stop set screw 58, which is received within the stop means 57, will contact and thereby stop the further pivoting motion of the toggle arms 35 and 36 relative to the workpiece support 50.

It should be noted from FIGURE 2 that in the clamping position, the resultant force applied through workpiece 51 is directed along force axis line 60 which passes through the nonmarring cap 29, the workpiece 51, second force application surface 52, and the center of the second pivot pins 54. The toggle arm axis line 41 passes through the center of the first and second pivot apertures 37, 38 of the toggle arms 35 and 36 and must be below, that is pass through the force application axis 60, to provide the toggle effect as indicated by the gap *dt* shown in FIGURE 2 between toggle axis 41 and force application axis 60.

It should be clear that as the toggle arms 35 and 36 are pivoted about second pivot pin 54 and about the pivot pins 17 in the swivel block 15, the clamp 25 is pivoted upwardly and out of the way of the workpiece 51 so that it can be removed and a new workpiece can be placed into the work support 50 without interference from the clamp assembly 1.

In FIGURE 3 a second embodiment or hand tool embodiment 101 of the clamp assembly is shown. Basically, the clamp assembly 101 is quite similar to the first embodiment 1 shown in FIGURES 1 and 2 except for variations to the first force application surface 129 of the C clamp shaped first force application means 125. Specifically, the knurled member 108 can be rotated in either direction to move sleeve 127 along threaded shaft 110 to move the first force application means 125 toward or away from swivel block 115, to change the gap between the terminal jaw piece 129 on the terminal end thereof and the jaw piece 152 on the second force application means shaped as leg member 150. The leg member 150 includes a handle portion 155 and a second pivot pin 154 which is pivotally attached to the second end 140 of the toggle arms 135 and behind it, 136 (not shown). The first end 139 of the toggle arm 135 is pivotally attached to first pivot pin 117 in swivel block 115. Stop means 157 is formed in a middle portion of the member 150 to engage one or the other, or both, of the toggle arms 135 and 136 at a point just past the point where the toggle arm axis 141 has passed through the force application axis 160 which is that axis that establishes the resultant clamping force between the jaw pieces 129 and 152 as it passes through the second pivot 154.

In order that the toggle arms 135 and 136 can be easily sprung upwardly when the clamping action is no longer desired, there has been provided a toggle release lever 170 which is pivotally attached at pivot 171 to the stop means 157 and includes a surface member 172 which may be wedged against toggle arms 135, 136 to move them upwardly when the lever 170 is moved upwardly.

To make jaw pieces 129 easily replacable, keyways 173 are fitted into the members 150 and 125, as shown in FIGURE 4, to support in a removable manner the jaw pieces 152 and 129, It should also be noted that due to the adusting provision of the member 125 through the rotating action of the shaft 108, it is possible to open or close the gap between the surfaces of the jaw pieces 129 and 152 while still maintaining a parallel relationship between the surfaces of these jaw pieces.

In addition to the flat surface jaw pieces 129 and 152 shown in FIGURES 3 and 4, several other shapes and sizes of jaw pieces, such as those shown in FIGURES 5 and 7, can be used with this embodiment. Jaw piece 129 can be formed to include a fastening shaft 128 which is removably snapped or threaded into socket 130 formed at the terminal end 126 of first force application means 125. In a similar manner, jaw piece 152 can be formed to include a fastening shaft 153 for removable attachment to the second force application means 150.

As shown in FIGURE 5, a square-shaped workpiece 178 may be clamped between notched jaw pieces 179 and 180 which are used in place of jaw pieces 129 and 152. FIGURE 6 shows an arcuate-shaped workpiece 183 held between concave-shaped jaw piece 184 and convex-shaped jaw piece 185. Angle 188 is shown in FIGURE 7 as it is clamped between complementary-shaped jaw pieces 187, 189. It is therefore seen that I have disclosed in FIGURES 3 to 7 a most versatile, simple and yet easily adjustable clamping tool.

Reference now is had to FIGURE 8 for a disclosure of a third embodiment 201 of the clamping assembly wherein the first force application means in the form of hook member 225 includes a concave terminal first force application surface 229 which corresponds to the surface of the workpiece cover 251. The mating workpiece wall edge 225 is held by the convex surface of the second force application means 252 which also includes a pivot 254 for pivotal connection with the end 240 of toggle arms 235. The first end 239 of the toggle arms 235, 236 is pivoted about first pivot pin 217 attached to swivel block 215. Stop means 257 may be mounted and extend from the swivel block 215 or, in the alternative, from the first end 239 of the toggle arms 235, 236 for engagement of its stop surface 258 with the surface of the side wall 255 of the workpiece. As an alternative structure taking the place of the stop means 257 or in addition to it, there is provided a finger guard 219 at one end of the knurled member 208 including an edge 220 for engagement with the side wall 255 of the workpiece, and thereby prevents further swinging action of the clamp assembly 201 about the pivot 254.

The point out yet a further variation of the useful configuration possible for the easy adjusting clamp assembly of the instant invention, reference is now directed to FIGURE 9 for a disclosure of the fourth embodiment 301 shown in a form useful for taking up the slack in binding cables or chains which might be strung about a load of logs or other material. As shown, the knurled member 308 can be rotated to adjust the position of the hook-like first force application means relative to swivel block 315. In this embodiment the first force transmitting surface of the hook 325 is at surface portion 329 where it is engaged by the chain length or cable loop 351. Toggle arms 335 are pivoted between the first pivot 317 on swivel block 315 and the second pivot 354 mounted at the forward end of the second force application means 350 so that the clamp assembly 301 can be pivoted about the pivots 354 and 317 for proper engagement and clamping of the chain or cable loop 351. The second force application means 350 includes an abutment portion serving as a stop means 357 to engage either the swivel block 317 or the toggle arms 335. At the lower end of the second member 350, there is a hook 352 formed for engagement with another loop 355 at the other end of the chain. Safety ring 371 may be looped between second means 350 and the enlarged portion 319 of knurled member 308 so that vibration does not cause the clamp assembly 301 to spring upwardly out of the toggled clamp position shown in FIGURE 9.

It is therefore seen that I have developed a simply designed, easily adjusted structure which can be used in a number of different types of tools to hold a hook-like member against a workpiece with toggle clamp-type action for a variety of different uses.

What is claimed is:

1. An adjustable tool comprising:
an assembly including adjusting rod means, swivel block means, first force application means, arm means, and second force application means in combination;
said adjusting rod means rotatably supported within an aperture formed in said swivel block means,
one end of said rod means extending outwardly from said aperture to provide a gripping portion for rotating the other end of said rod means extending outwardly from the other end of said aperture to provide a threaded shaft portion,
said rod and block means including means for preventing movement of said block means axially along said rod means,
said swivel block means including first pivot means for pivotally supporting one end of said arm means,
said first force application means including a first force application surface and an internally threaded sleeve means adapted to move along and engage said threaded shaft,
said second force application means including a second force application surface and a second pivot means for pivotally supporting the other end of said arm means for swinging said first force application surface means relative to said second force application means.

2. The tool of claim 1 wherein:
said first force application means is formed with the axis of said threaded sleeve coaxial with the axis of the resultant force imposed on said second force application surface by said first force application surface.

3. The tool of claim 1 wherein:
said first force application surface includes a nylon cap to prevent marring any workpiece contacted by said first force application surface.

4. The tool of claim 1 wherein:
said gripping portion of said adjusting rod means includes an enlarged end ring which serves as a finger guard means.

5. The tool of claim 1 wherein:
said swivel block means also includes stop means in the path of said pivoting assembly to limit its range of pivot relative to said second force application means.

6. The tool of claim 1 wherein:
said second force application means includes stop means positioned in the path of said assembly to limit the range of pivot of said arm means about said second pivot means.

7. The tool of claim 6 including:
toggle release lever means pivotally connected to said stop means and including a wedging surface which moves said assembly relative to and away from said stop means.

8. The tool of claim 1 wherein:
said first force application means includes a first jaw piece with an exterior surface thereof establishing a first plane substantially normal to the axis of said threaded sleeve, and
said second force application means includes a second jaw piece with an exterior surface thereof establishing a second plane substantially parallel to said first plane when said assembly has reached the extent of its pivot about said second pivot means.

9. The tool of claim 8 wherein:
said first and second jaw pieces are removably mounted in said first and second force application means.

10. The tool of claim 8 wherein:
said first and second jaw pieces include surfaces of complementary shapes.

11. An adjustable toggle clamp tool comprising:
a clamp assembly including adjusting rod means, swivel block means, first force application means, toggle arm means, and a second force application means in combination;
said adjusting rod means including a bearing shaft portion which spans axially between a knurled portion at one end and a threaded shaft portion at the other end,
said swivel block means defining an axial rod aperture formed to provide a busing for rotatably supporting said bearing rod portion of said adjusting rod means and including first pivot pin means projecting outwardly from said block means and having an axis 90° from the axis of said rod aperture,
said rod and block means including means for preventing movement of said block means axially along said rod means, said first force application means including a first force application surface at the terminal end thereof and an internally threaded sleeve means at the other end thereof adapted to move along and engage said threaded shaft, said second force application means including a second force application surface and a second pivot means having an axis parallel to but spaced from said first pivot means of said swivel block means, and said toggle arms means pivotally connected between said first and second pivot means for swinging said first force application surface means relative to said second force application surface.

12. In a tool an adjustable assembly comprising:

adjusting rod means, swivel block means, and force application means in combination;

said swivel block means defining an aperture therethrough for rotatably supporting said adjusting means, one end of said rod means extending outwardly from said aperture to provide a gripping portion for rotating the other end of said rod means extending outwardly from the other end of said aperture to provide a threaded shaft portion;

said rod and block means including means for preventing movement of said block means axially along said rod means, said force application means including a force application surface in one portion thereof and an internally threaded sleeve means formed in another portion thereof, said sleeve means adapted to move along and engage said threaded shaft for moving said force application surface relative to said swivel block means as said gripping portion rotates said threaded shaft.

13. The tool of claim 12 wherein:

said gripping portion is knurled to provide easy gripping.

References Cited

UNITED STATES PATENTS

| 257,263 | 5/1882 | Wood. |
| 797,715 | 8/1905 | Boyd. |
| 1,280,408 | 10/1918 | Cox. |
| 1,445,344 | 2/1923 | Moltrup. |
| 1,504,037 | 8/1924 | Furman et al. |
| 2,179,173 | 11/1939 | Boomgarden. |
| 2,610,662 | 9/1952 | Ratcliff. |
| 3,210,070 | 10/1965 | Lagana _____ 269—228 |

FOREIGN PATENTS 581,670  10/1946  Great Britain.

DONALD A. GRIFFIN, *Primary Examiner.*

U.S. Cl. X.R.

269—228, 249; 254—78; 220—55